United States Patent [19]
Miyano et al.

[11] 3,856,699
[45] Dec. 24, 1974

[54] PROCESS FOR PRODUCING CAPSULES HAVING WALLS OF A WAXY MATERIAL

[75] Inventors: Shizuo Miyano; Asaji Kondo, both of Saitama, Japan

[73] Assignee: Fuji Photo Film Co., Ltd., Kanagawa, Japan

[22] Filed: Oct. 24, 1972

[21] Appl. No.: 300,072

Related U.S. Application Data

[63] Continuation of Ser. No. 61,563, Aug. 6, 1970, abandoned.

[30] Foreign Application Priority Data
Aug. 8, 1969 Japan................................ 44-62739

[52] U.S. Cl..................... 252/316, 8/79, 106/307, 106/308 F, 106/308 Q, 117/100 A, 117/100 B, 117/119.4, 252/522, 424/38, 426/96, 426/99, 426/221, 426/307
[51] Int. Cl.......................... B01j 13/02, B44d 1/02
[58] Field of Search..... 252/316; 117/100 A, 100 B, 117/119.4; 424/38

[56] References Cited
UNITED STATES PATENTS

| | | | |
|---|---|---|---|
| 2,875,130 | 2/1959 | Grass, Jr. et al. | 424/38 X |
| 3,161,602 | 12/1964 | Herbig et al. | 252/316 |
| 3,167,602 | 1/1965 | Bentov et al. | 117/100 A X |
| 3,265,629 | 8/1966 | Jensen | 252/316 |
| 3,541,204 | 11/1970 | Sibbald et al. | 424/38 |

FOREIGN PATENTS OR APPLICATIONS
1,008,044  10/1965  Great Britain...................... 252/316

*Primary Examiner*—Richard D. Lovering
*Attorney, Agent, or Firm*—Sughrue, Rothwell, Mion, Zinn & Macpeak

[57] ABSTRACT

A process for producing capsules having walls of a waxy material which comprises dropwise dispersing a waxy material containing a core material in an agitated aqueous medium at a temperature higher than the melting point of the waxy material, and passing the waxy material into a non-agitated aqueous medium at a temperature lower than the melting point of the waxy material, is disclosed.

12 Claims, 2 Drawing Figures

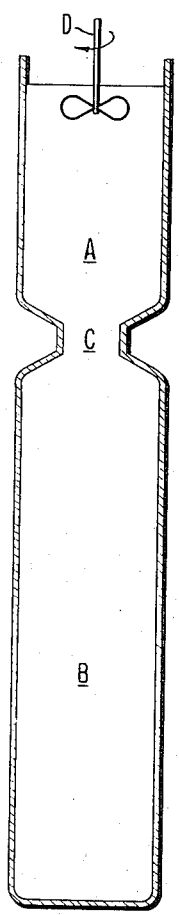
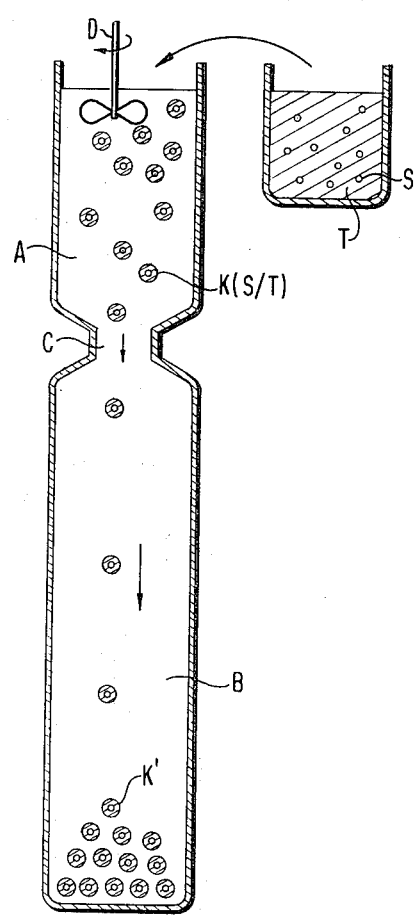

PROCESS FOR PRODUCING CAPSULES HAVING WALLS OF A WAXY MATERIAL

This is a continuation of application Ser. No. 61,563, filed Aug. 6, 1970, and now abandoned.

BACKGROUND OF THE INVENTION

1. Field of the Invention

This invention relates to a process for producing capsules having the walls of a waxy material in an aqueous medium. In particular, the invention is characterized by separating the layer of the aqueous medium into an upper layer and a lower layer of different temperatures.

2. Description of the Prior Art

A waxy material generally is solid at normal temperatures but is softened and liquified at temperatures higher than normal temperatures, that is, the waxy material has a melting point higher than normal temperatures (20°C). Therefore, by utilizing these properties, core materials can be encapsulated by only controlling the temperature.

Processes of making capsules by utilizing the characteristics of the waxy materials are disclosed in the specifications of, for example, Japanese Patent Publication Nos. 5911/64, 1415/66, 1540/66, 26389/69 and 3677/69, and U.S. Pat. No. 3,389,000. However, each of these processes requires a specific medium or specific apparatus for conducting it.

An object of the present invention is to provide a method for producing capsules having walls of a waxy material capable of encapsulating both hydrophilic materials and hydrophobic materials in an aqueous medium in which the apparatus and the operation are simple.

SUMMARY OF THE INVENTION

The process of this invention for preparing capsules having walls of a waxy material comprises dropwise dispersing a waxy material containing a core material in an aqueous medium at a temperature higher than the melting point of the waxy material, and passing the waxy material into an aqueous medium at a temperature lower than the melting point of the waxy material.

BRIEF DESCRIPTION OF THE DRAWINGS

FIG. 1 shows an apparatus suitable for use in the process of the present invention.

FIG. 2 shows one embodiment of the process of the present invention.

DETAILED DESCRIPTION OF THE INVENTION

The general process of producing capsules having walls of a waxy material according to the instant invention will be explained by reference to FIG. 1 and FIG. 2 of the accompanying drawings.

In FIG. 1, a vessel for conducting the encapsulation is divided into Section A and Section B, which are connected by Section C. An aqueous medium fills the vessel. Section A is equipped with an agitator D and the aqueous medium in Section A is maintained at a temperature higher than the melting point of the waxy material. On the other hand, the aqueous medium in Section B is cooled to a temperature lower than the melting point of the waxy material and in this section the liquified waxy material forming the walls of capsules is solidified and fixed. Also, Section B can be equipped with a means for storing and recovering the capsules. The same aqueous medium fills Sections A and B and the temperature of the medium in Section A is different from that of the aqueous medium in Section B at the Boundary Section C and it has been experimentally confirmed that the aqueous medium at the higher temperature mixes less with the aqueous medium having the lower temperature from a practical standpoint.

In the practice of the process of this invention the aqueous medium in Section A is agitated slightly as shown in FIG. 2. By controlling the stirring rate, the size of the droplet is determined. A dispersion of core materials S in a waxy material T liquified to a temperature higher than the melting point of the waxy material is added dropwise to the aqueous medium in Section A while heating the medium so that the dispersion does not solidify. Alternatively the dispersion, once dried and/or solidified, is crushed into a solid powder having a suitable size, and then the crushed solid material is added to the aqueous medium at the higher temperature, whereby the crushed particles form droplets K. Droplet K shows the condition in which the core material S has been dispersed in the liquified waxy material T. Droplet K is spherical and falls down through Section B due to the action of gravity. Since the aqueous medium in Section B is at a lower temperature, the waxy material of the droplets is solidified to provide solid capsules K'.

The aqueous medium in the Section A can be heated internally by inserting a heater in the medium or by blowing steam into the medium or it can be heated externally by known methods. Also, the aqueous medium in Section B can be cooled externally by any suitable manner or it can be cooled by placing an inlet pipe and an outlet pipe in Section B and circulating the medium yet keeping the aqueous medium level so that the aqueous medium in boundary Section C does not fluctuate. Moreover, the capsules formed in Section B can be continuously removed from the system by means of an appropriate takeoff.

In the process of the invention, it is preferable to use a waxymaterial which is stable to heat, having a melting point of about 100°C., and being inert to the core material. Suitable waxy materials for use in this invention are, for example, vegetable waxes such as Japan tallow, cotton wax or turpentine; animal waxes: beeswax, whale wax or hydrous lanolin; mineral waxes such as paraffin or chlorinated paraffin; and synthetic materials such as low molecular weight (less than 5000) polyethylenes, denatured waxes, denatured rosins, hardened oils, fatty acid, alcohols, for example, cetyl alcohol, esters, for example fatty acid glycerides, or amides.

In addition to water as the aqueous medium used in the instant invention, an aqueous solution of an organic salt or an inorganic salt; an aqueous solution of a colloid material, such as gum arabic, gelatin, polyvinyl alcohol, the celluloses, and the like, or a surface active agent; and an aqueous solution having dispersed therein a fine powder such as silica powder, kaolin powder, or a starch can be used.

In accordance with the process of this invention, an amino acid or a seasoning, such as methionine and sodium glutamate, can be encapsulated with an edible hardened oil. Further, by the process of this invention perfumes, dyestuffs, medicines, and the like, can be encapsulated also.

The size of the capsules can be controlled from 20 microns to 500 microns by controlling the agitation or by preliminarily controlling the size of the finely crushed solid waxy material before it is added to the aqueous medium with capsules having sizes of about 0.5 mm to 2 mm being more readily formed.

EXAMPLE 1

This example shows an embodiment of encapsulating methionine powder with a hardened oil. A glass vessel having a shape as shown in FIG. 1 was used. The diameter of the upper section was 15 cm and a narrowed lower end portion thereof having a length of 3 cm and a diameter of 1.5 cm was connected to a lower section by means of a rubber tube. The lower section was a test tube having a length of 30 cm and a diameter of 2.5 cm. After the lower section was filled with water at 10°C., the upper section was filled with water at 80°C. On the other hand, 2 g of methionine powder and 1 g of kaolin were dispersed in 7 g of hardened beef tallow having a melting point of 58°C. at 70°C. The dispersion was added to the medium in the upper section with agitation of the medium so that it was emulsified in a 0.5–2 mm. size range. After the emulsification was completed, the agitation in the upper section was decreased, whereby the capsules fell down into the lower section due to the action of gravity. In the lower section, the capsules were cooled and then the walls of the capsules were solidified. Spherical capsules of beef tallow containing methionine were obtained.

EXAMPLE 2

After dispersing 10 g of carbon black and 5 g of bentonite in 30 g of paraffin, having a melting point of 65°C., under heating, the dispersion was solidified by cooling and then crushed into a powder of from 200 to 300 microns in size. By using the same procedure as described in Example 1 and with the same apparatus as used in Example 1, pigment-containing capsules having sizes of from 200 to 300 microns were obtained.

What is claimed is:

1. A process for producing controlled particle size capsules consisting essentially of walls of a single waxy material surrounding a single core material, said process comprising dropwise dispersing a waxy material containing a core material particle in a first agitated aqueous medium maintained at a temperature higher than the melting point of the waxy material, and allowing the waxy material containing said core material particle to fall by gravity from said first agitated aqueous medium into a second non-agitated aqueous medium maintained at a temperature lower than the melting point of the waxy material thereby forming said capsules, the size of the capsules being regulated by the amount of agitation in said first aqueous medium.

2. The process as claimed in claim 1, wherein said waxy material has a melting point of from 50° to 100°C.

3. The process as claimed in claim 2, wherein said waxy material is a member selected from the group consisting of Japanese tallow, cotton wax and turpentine.

4. The process as claimed in claim 2, wherein said waxy material is a member selected from the group consisting of beeswax, whale wax and hydrous lanolin.

5. The process as claimed in claim 2, wherein said waxy material is a member selected from the group consisting of paraffin and chlorinated paraffin.

6. The process as claimed in claim 2, wherein said waxy material is a member selected from the group consisting of a polyethylene having a molecular weight lower than 5000, a denatured wax, a denatured rosin, a hardened oil, a fatty acid, a long chain alcohol, a fatty acid ester and an amide.

7. The process as claimed in claim 1, wherein said aqueous medium is water.

8. The process as claimed in claim 1, wherein said aqueous medium is an aqueous solution of a member selected from the group consisting of an inorganic salt, an organic salt, gum arabic, gelatin, polyvinyl alcohol and cellulose.

9. The process as claimed in claim 1, wherein said aqueous medium is an aqueous dispersion of a member selected from the group consisting of silica, kaolin and starch.

10. The process according to claim 1 wherein said first and second aqueous mediums are contained in a container having a constricted boundary between the upper and lower portions of said container, said first aqueous medium maintained at a temperature higher than the melting point of said waxy material being in the upper portion of said container and said second aqueous medium maintained at a temperature lower than the melting point of said waxy material being in the lower portion of said container, wherein said waxy material containing said core material particle is allowed to fall by gravity from the upper portion of said container containing said first aqueous medium into the lower portion of said container containing said second aqueous medium through the constricted boundary, the boundary being constricted to assure that said second aqueous medium is not agitated due to the agitation of said first aqueous medium in the upper portion of said container.

11. A process for producing controlled particle size capsules consisting essentially of walls of a single waxy material surrounding a single core material particle, said process comprising:

dispersing core material particles in a waxy material with heating at a temperature higher than the melting point of the waxy material forming a dispersion of said core material particles in said waxy material;

adding dropwise the resulting dispersion to a first agitated aqueous medium maintained at a temperature higher than the melting point of the waxy material; and allowing the waxy material containing said core material particle to fall by gravity from said first agitated aqueous medium into a second non-agitated aqueous medium maintained at a temperature lower than the melting point of said waxy material thereby forming said capsules, the size of the capsules being regulated by the amount of agitation in said first aqueous medium and also by the original size of said core material particles.

12. A process for producing controlled particle size capsules consisting essentially of walls of a single waxy material surrounding a single core material particle, said process comprising:

dispersing core material particles in a waxy material with heating at a temperature higher than the melting point of the waxy material to form a dispersion of said core material particles in said waxy material;

drying the resulting dispersion to obtain solid particles consisting of said waxy material surrounding individual particles of said core material;

adding dropwise said solid particles to a first agitated aqueous medium maintained at a temperature higher than the melting point of the waxy material; and allowing said solid particles to fall by gravity from said first agitated medium into a second non-agitated aqueous medium maintained at a temperature lower than the melting point of said waxy material thereby forming said capsules, the size of the capsules being regulated by the amount of agitation in said first aqueous medium and also by the original size of said core material particles.

* * * * *